Dec. 27, 1960  J. W. O'NEILL  2,966,658
FLUID PRESSURE WARNING APPARATUS
Filed June 11, 1958  2 Sheets-Sheet 1
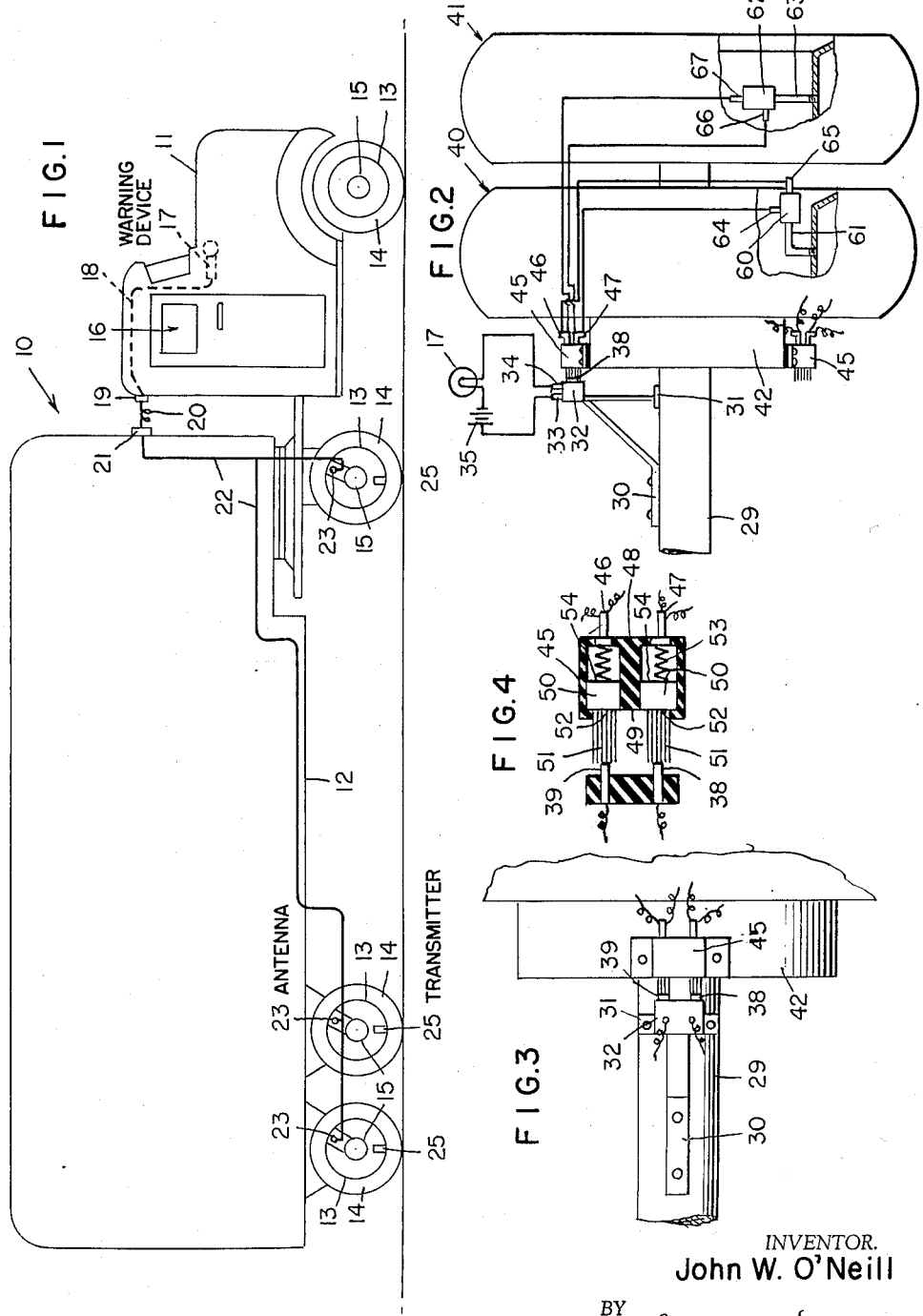
INVENTOR.
John W. O'Neill
BY
Shoemaker & Mattare
ATTYS Dec. 27, 1960 J. W. O'NEILL 2,966,658
FLUID PRESSURE WARNING APPARATUS
Filed June 11, 1958 2 Sheets-Sheet 2
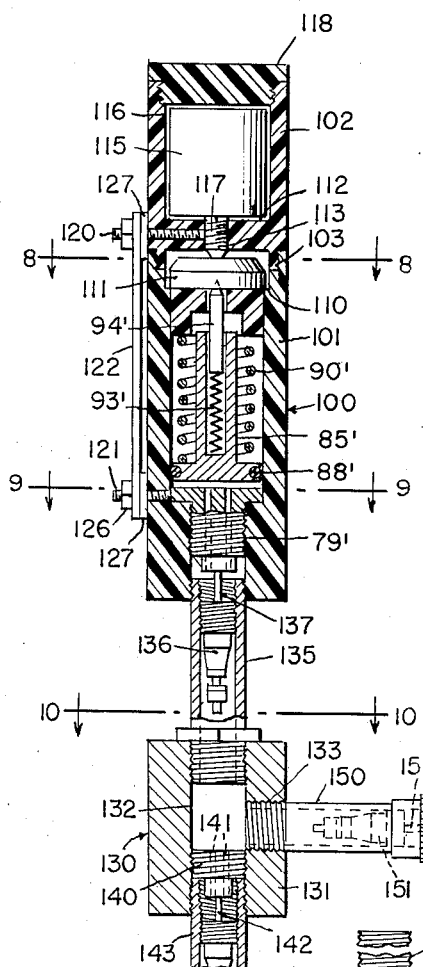
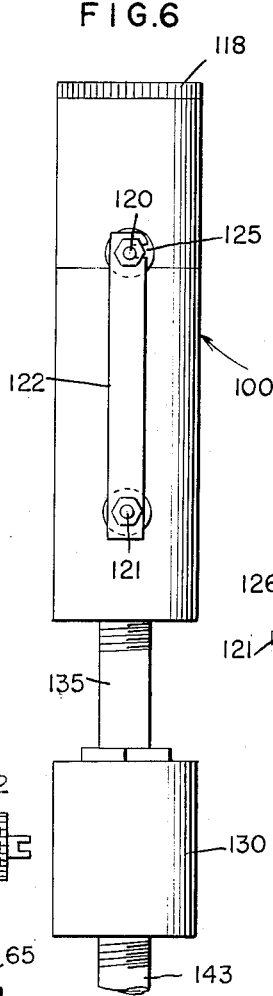
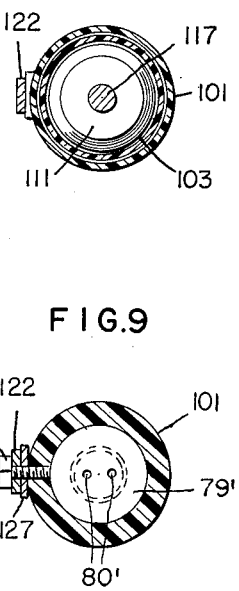
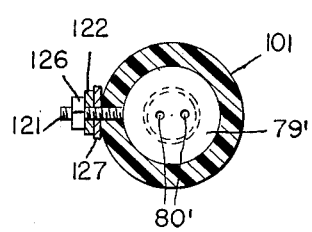
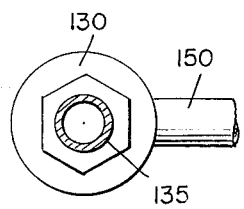
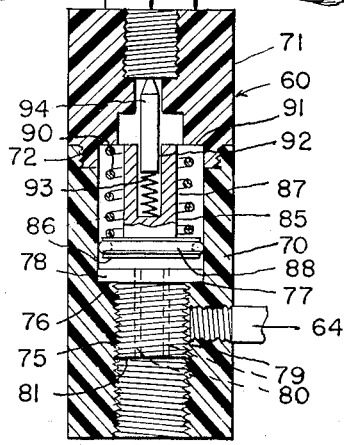
INVENTOR.
John W. O'Neill
BY
Shoemaker & Mattare
ATTYS

United States Patent Office

2,966,658
Patented Dec. 27, 1960

2,966,658

FLUID PRESSURE WARNING APPARATUS

John W. O'Neill, Corpus Christi, Tex.
(4180 Byron St., Apt. A, Palo Alto, Calif.)

Filed June 11, 1958, Ser. No. 741,248

5 Claims. (Cl. 340—58)

The present invention relates to a new and novel fluid pressure warning apparatus, and more particularly to fluid pressure apparatus for warning of lowered pressures in tires on large wheeled vehicles.

In large trucks and buses or other similar vehicles, it is especially important that the tires of the vehicle remain under proper fluid pressure during operation of the vehicle. Such large vehicles ordinarily employ dual wheeled arrangements or, in other words, a pair of wheels is mounted adjacent one another at each end of the axles of the vehicle. It is standard practice for the drivers of trucks, etc. to periodically check the inflation of the tires to determine if they are in satisfactory operating condition.

Although periodic inspection of the tires is satisfactory to a certain extent, it does not solve the problem because of the fact that a tire may lose its pressure almost immediately after it has been checked. When heavy loads are being carried by vehicles having dual-tired arrangements, the loss of inflation in one of the tires can create an extremely hazardous condition. For example, if the inner tire should be below its ordinary operating pressure such that it is what is generally termed as being soft, the entire load may be carried by the outside wheel. When rounding a curve when such a condition exists, especially when the load is liquid or of a type which shifts when rounding curves, additional strain is placed on one tire which may cause it to blow out, which often results in the vehicle tipping or rolling over. Of course, this situation is very dangerous when considered in connection with buses which travel at relatively high speeds and accidents caused by blowouts may cause serious bodily injury to the passengers of the bus. Under-inflation is also additionally hazardous due to the fact that when in such condition friction increases, thereby developing excessive heat which may even be high enough to burn the tire and set fire to surrounding parts of the vehicle and perhaps even cause the entire vehicle to burn up.

The present invention provides an extremely compact and simple system which is inexpensive in construction, and which may be readily adapted for use with the existing structure of present day vehicles. The system employs a warning mechanism which is preferably mounted within the driving compartment of the vehicle in such a position that it provides a readily discernible warning to the driver. Such warning may be either a visual or an audible one, or possibly a combination thereof, to insure that the driver is immediately informed of low pressures in the tires.

An object of the present invention is to provide a new and novel fluid pressure warning apparatus which immediately notifies the driver of a vehicle when the pressure in any one of the tires drops below a desired level.

Another object is to provide a fluid pressure warning apparatus which will provide an intermittent signal to the driver which is more likely to catch his attention.

A further object of the invention is to provide fluid pressure warning apparatus wherein the necessity of providing an entirely mechanical interconnection between the various components of the system is eliminated.

Yet another object is to provide a switch unit which is extremely simple, inexpensive and compact in construction and yet which is efficient and reliable in operation.

Other objects and many attendant advantages of the invention will become more obvious when considered in connection with the accompanying specification and drawings wherein:

Fig. 1 is a general view of a truck employing the invention system,

Fig. 2 illustrates somewhat schematically the interconnection of the switch means and wiping contact members mounted adjacent the end of an axle, Fig. 3 illustrates a top view of a portion of the apparatus shown in Fig. 2, Fig. 4 illustrates a sectional view through the wiping brush and wiping contact assemblies, Fig. 5 illustrates a switch means according to the present invention, Fig. 6 illustrates a modification of the switch means according to the present invention, Fig. 7 is a longitudinal section of the switch means shown in Fig. 6, Fig. 8 is a sectional view taken along line 8—8 of Fig. 7, Fig. 9 is a sectional view taken along line 9—9 of Fig. 7, and Fig. 10 is a sectional view taken along line 10—10 of Fig. 7.

Referring now to the drawings wherein like reference characters designate corresponding parts throughout the several views, there is shown in Fig. 1 a truck indicated generally by reference numeral 10 including a tractor portion 11 and a trailer portion 12, the tractor and trailer being connected to one another in the conventional manner. The tractor and trailer are supported by a plurality of wheels 13 having air-inflated tires 14 of conventional construction mounted thereon. Each of the wheels is mounted upon an axle 15 mounted on the vehicle in a well known manner. A driver's compartment indicated generally by reference numeral 16 is disposed within the tractor, and a warning mechanism 17 is mounted in a suitable position such as on the dashboard, whereby the operator of the vehicle will be immediately warned of any drop of pressure in the tires below the desired level. Warning mechanism 17 may be of any desired type such as a light bulb or a buzzer, depending upon whether it is desired to give visible or audible warning. Warning mechanism 17 is connected by electric wiring indicated schematically at 18 to a terminal box 19. A shielded cable 20 extends from the terminal box 19 to a jack box 21 supported on the forward surface of the trailer. Jack box 21 is connected by electrical leads 22 to suitable signal pick-up devices 23 mounted on the axles adjacent each of the wheels. It should be noted at this point that in trucks of this size, a pair of wheels are usually mounted at each end of the axle and accordingly it should be understood that only the outer wheel of each pair of adjacent wheels is visible in Fig. 1. Signal pick-up members 23, as illustrated, are small antennas although it should be noted that the mechanical pick-up means as described heretofore may also be mounted at such location. Reference numeral 25 indicates the pressure sensitive sensing means of the present invention which is subjected to the fluid pressure within the associated tire, and which controls operation of the electric circuit including warning mechanism 17. A pressure sensitive sensing means 25 is associated with each of the individual tires the pressure of which it is desired to measure.

Referring now to Figs. 2–4 of the drawings, the mechanically interconnected modification of the electrical circuit is more clearly illustrated. As seen in Figs. 2 and 3, a pair of brackets 30 and 31 are fixed to an axle 29 of the vehicle and support at the upper end thereof a housing 32. Housing 32 has a pair of terminals 33 and 34 which, as illustrated in Fig. 2, in a schematic manner, are connected in the electrical circuit including the battery 35 of the vehicle and the warning mechanism 17. As seen most clearly in Figs. 3 and 4, a pair of wiping contacts 38 and 39 project laterally from the side wall of housing 32, contacts 38 and 39 being connected to terminals 33 and 34 respectively.

As seen in Fig. 2, a pair of wheels having tires thereon are indicated generally by reference numerals 40 and 41, the brake drum 42 of wheel 40 projecting laterally therefrom toward the housing 32. A pair of identical housings 45 formed of dielectric material are mounted at diametrically opposite portions of brake drum 42 on the outer surface thereof.

Referring to Fig. 4, the construction of each of housings 45 is more clearly illustrated. Each of housings 45 has a pair of electrically conductive terminals 46 and 47 projecting through the outer wall 48 thereof, the opposite inner wall of the housing being open. An intermediate wall 49 projects across the housing and serves to divide the housing into two portions for guidably supporting slidable electrically conductive contacts 50 therein. Each of contacts 50 has a laterally extending resilient brush member 51 of flexible resilient construction as is conventional in such brushes on one side surface 52 thereof. A compression spring 53 is mounted between the inner surface 54 of each of sliding contacts 50 and the associated terminals 46 and 47 for resiliently urging the wiping brushes 51 toward the wiping contacts 38 and 39.

It is apparent from the foregoing description that an electrical interconnection is provided between terminals 46 and 47 and each of the brushes 51, although the separate brushes 51 are effectively insulated from one another. Springs 53 urge the wiping brushes 51 into contacting engagement with wiping contacts 38 and 39 such that upon each half revolution of the wheel carrying the brake drum upon which housings 45 are mounted, the wiping brushes will be brought into contact with the wiping contacts.

As seen in Fig. 2, a fixed pressure sensing or switch means 60 is connected to a conduit 61 so as to be under the influence of the fluid pressure within the associated tire, and a second similar fluid pressure sensitive or switch means 62 is mounted on wheel 41 and is connected by means of conduit 63 such that it is under the influence of the fluid pressure within the associated tire. A pair of terminals 64 and 65 project outwardly from switch means 60, and a pair of terminals 66 and 67 project outwardly from switch means 62. Terminals 64 and 66 of the respective switchs are connected to terminal 47 of housing 45 and terminals 65 and 67 of the respective switches are connected to terminal 46 of the housing 45. It is accordingly clear that switches 60 and 62 control the operation of the electrical circuit such that upon closing of the switches, warning mechanism 17 will be energized, and when the switches are open, the warning mechanism will not be energized.

Referring now to Fig. 5 of the drawings, switch means 60 is illustrated in greater detail, although it should be noted that switch means 62 is identical in construction as well as each of the other switch means employed in the warning apparatus according to the present invention. Switch means 60 comprises an elongated hollow body member formed of dielectric material having a main body portion 70 having a cap portion 71 threadedly mounted thereon at the threaded connection 72 between these members. Terminals 64 and 65 project through suitable openings provided in main body portion 70 and cap portion 71, respectively, so as to project into the cavity formed within these members.

The lower end of the opening extending longitudinally through portion 70 is threaded as indicated at 75 and includes a shoulder portion 76 which supports a first contact member 77 having an enlarged head portion 78 supported by the shoulder 76 and a threaded shank portion 79 of reduced diameter threaded within the opening 75. A pair of fluid conducting conduits 80 extend longitudinally through contact member 77 and provide a means whereby fluid pressure entering the lower portion of opening 75 may pass upwardly through contact member 77 for a purpose more fully hereinafter described.

A second contact member or piston 85 is slidably mounted in the cavity within portion 70 and includes an enlarged head portion 86 and a shank portion 87 of reduced diameter. Enlarged head portion 86 has a circumferentially extending groove formed in the outer surface thereof which receives an annular sealing ring 88 formed of neoprene or similar material for providing a seal between contact member 85 and portion 70. A compression spring 90 of substantially cylindrical configuration surrounds shank portion 87 of contact member 85 and bears at opposite ends thereof against the inner surface of head portion 86 of contact member 85 and against shoulder 91 of portion 71 of the body member. Spring 90 serves to urge contact member 85 into engagement with contact member 77, each of these contact members being formed of electrically conductive material. It should also be noted that contact member 77 is disposed in engagement with terminal member 64 for providing a good electrical interconnection therebetween.

Shank portion 87 of contact member 85 has a longitudinally extending bore 92 formed therein within which is disposed a compression spring 93. A plunger 94 is also slidably mounted within bore 92, and it is apparent that compression spring 93 urges plunger 94 away from the contact member 87 at all times. The upper end of plunger 94, as seen in Fig. 5, is pointed and is urged into engagement with the lower end of terminal 65 for providing a good electrical contact therewith at all times regardless of the position of contact member 85 with respect to terminal 65. Plunger 94 is also formed of electrically conductive material and has a tight fit with contact member 85 for providing an electrical interconnection therebetween.

It is apparent from the description that the electrical circuit to warning mechanism 17 of the system is completed through contact members 77 and 85 of the switch means in the system. When the switch means is mounted upon the conventional valve stem of an associated tire, the lower surface 81 of member 79 engages the conventional tire valve stem, depressing the valve stem such that fluid pressure within the tire is transmitted upwardly through conduits 80 and member 79 so as to impinge upon the lower surface of contact member 85 as seen in Fig. 5. The strength of spring 90 may be selected so as to permit movement of contact member 85 under any desired pressure. When the pressure in the tire is at least equal to this desired pressure or greater, contact member 85 will be moved away from contact member 76, breaking the electrical interconnection between the engaging surfaces of these contact members, thereby interrupting the circuit to the warning mechanism. It is accordingly apparent that when spring 90 is properly chosen to close the circuit through the contacts only when the fluid pressure acting on contact 85 drops below a certain minimum magnitude, the contacts will be closed only when the pressure in the tire is dangerously low. Upon closing of the contacts, the electrical circuit will be energized and warning mechanism 17 will be actuated. Due to the rotation of the wheels and the spacing of the wiping brushes about the brake drums of the wheels, an intermittent signal will be provided by the warning mechanism which will be more likely to catch the attention of the operator of the vehicle.

In certain applications, it is desirable to eliminate the entire mechanical interconnection in the electrical circuit, and accordingly a modified form of the invention may be employed. According to the modification of the invention as illustrated in Figs. 6–10 a transmitter and antenna system is employed for causing energization of the warning mechanism upon closing of the contacts in the switch means or sensing device. Referring now to Figs. 6–10, a housing 100 formed of dielectric material comprises a main body portion 101 and a cap portion 102 threaded therein by means of a threaded interconnection indicated by reference numeral 103. A first contact member 79' is constructed similar to contact member 79 of the device shown in Fig. 5 and a second contact member 85' is constructed similar to contact member 85 as seen in Fig. 5, the only difference being in the dimensions of the components. The parts associated with contact members 79' and 85' similar to those associated with contacts 79 and 85 of the device shown in Fig. 5 have been given the same reference numerals primed, and it is apparent that the general arrangement is the same. A shoulder 110 is provided within portion 101 and supports thereon a small battery 111 which is normally engaged by the upper pointed end of plunger 94'. Portion 102 has a lower wall 112 having a central threaded opening 113 formed therethrough. A miniature transistor type signal transmitter 115 is disposed within a cavity 116 formed within portion 102, transmitter 115 having an integral downwardly extending threaded socket 117 which is threaded within opening 113 and engages the upper surface of battery 111. A top 118 is threaded within a correspondingly threaded portion at the upper end of portion 102 for closing cavity 116 after the transmitter 115 is placed within the cavity in operative position. A radially projecting conducting terminal 120 projects outwardly from portion 102, the inner end of terminal 120 being in electrical contact with socket 117 of transmitter 115.

An electrically conductive terminal 121 projects radially through portion 101 of the housing and has the inner end thereof in electrical contact with contact member 79'. A strip of electrically conductive material 122 is disposed in spanning relationship between terminals 120 and 121, strip 122 being pivoted to terminal 121, the opposite end of strip 122 being provided with a laterally extending groove 125 opening in one side surface thereof such that the entire strip may be pivoted about the terminal 121 such that terminal 120 is received within groove 125 when in the position shown in Fig. 6, and the entire strip 122 may be pivoted completely out of engagement with terminal 120. Nuts 126 are threaded on the outer threaded ends of terminals 120 and 121 for maintaining the strip 122 in proper operative position. As seen in Fig. 9, strip 122 is disposed between nuts 126 and washers 127 disposed about terminals 120 and 121 respectively.

Conductive strip 122 is provided for interrupting the circuit through transmitter 115 such that it may be pivoted out of contact with terminal 120 to prevent the transmitter 115 from continually sending out a signal when insufficient pressure is present in the tire. Once the driver has been warned of a dangerous condition in the tire, it is no longer necessary to provide a continual signal which would only tend to run down the battery.

An adapter 130 is mounted at the lower end of housing 100, adapter 130 including a main body portion 131 having a longitudinally extending opening 132 formed therein and bisected by a communicating radially extending opening 133, opposite ends of opening 132 being threaded, and opening 133 being similarly threaded. Threaded within the upper end of opening 132 is a hollow member 135 the upper end of which is threaded within the lower end of the opening in housing 100. A conventional tire valve 136 having an upwardly projecting valve stem 137 is disposed within member 135, the valve stem being depressed by the lower surface of contact member 79' in the position shown in Fig. 7 to open valve 136. A fitting 140 constructed similar to contact member 79' within housing 100 is provided with a pair of conduits 141 therethrough, and a lower surface thereof is adapted to engage the upwardly extending valve stem 142 of the tire so as to provide communication between the interior of the tire and opening 132 in the adapter. It is apparent that adapter 130 is threaded downwardly onto the connection 143 surrounding the valve and valve stem of the tire.

A hollow member 150 is threaded at one end within opening 133 and has therein another conventional tire valve 151 having a valve stem 152 projecting therefrom. It is apparent that fluid pressure may be inserted through valve 151 for filling the tire, and subsequent to inflating the tire, the fluid pressure within the tire will be transmitted to the interior of housing 100 for actuating the contacts of the switch means therein. Adapter 130 also provides a means whereby the position of housing 100 relative to the tire may be adjusted.

The various dielectric portions of the apparatus are preferably constructed of molded plastic with all the threads and contact members of electrically conductive material molded therein so as to make the construction extremely cheap and sturdy so as to resist vibrations when traveling over bumpy roads. It is apparent that the entire switch unit will resist any damage due to heat particularly since the rotation of the wheels produces a cooling effect due to the passage of air about the device.

In practical applications of the invention, the springs employed in the switch means of the apparatus may be designed to provide sufficient force to close the contacts when the fluid pressure in the tires drops below 80 p.s.i. Large trucks of the type with which this invention is particularly adapted for use, generally carry approximately 100 p.s.i. in the tires during operating conditions, and any drop in pressure within the tires below 80 p.s.i. is considered hazardous. It is apparent that the strength of the springs employed will vary in accordance with the particular conditions under which the tire is operating. It should also be noted that in the modification utilizing the transmitters and antennas, the pressure within the spare tires may also be continuously measured so as to provide sufficient warning to the driver if the pressure in the spare tires should drop below the desired point, since low pressure in a spare tire could prove to be extremely inconvenient should it be necessary to replace a tire where other tires were not available.

It is apparent from the foregoing that there is provided a new and novel fluid pressure actuated warning apparatus which immediately notifies the driver of a vehicle when the pressure in any one of the tires drops below a desired level. An intermittent signal is provided to the driver for catching his attention, and according to one modification of the invention, the necessity of providing an entirely mechanical interconnection between the various components of the system is eliminated. The switch unit employed in the system is extremely simple, inexpensive, compact and sturdy in construction to operate under rough conditions, and yet the device is quite efficient and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

The claims:

1. Fluid pressure warning apparatus for use in a vehicle having a plurality of supporting wheels including a warning mechanism disposed in proximity to the driver's seat of the vehicle, electrical signal conducting means extending from said warning mechanism to a point adjacent each of said wheels, a receiving antenna means connected to said electrical signal conducting means at said points, each of said antenna means being connected to a fixed portion of the vehicle closely adjacent said wheels, each of said wheels having a fluid pressure inflated tire thereon, a self-contained unit comprising a fluid pressure sensitive switch means mounted on each of said wheels and being in fluid communication with the interior of each of said tires, each of said switch means including signal transmitting means for generating a signal to be picked up by an adjacent antenna means, said switch means being normally urged into closed position for energizing said signal transmitting means and being urged to open position by fluid pressure within the associated tire for de-energizing said signal transmitting means, said switch means and said signal transmitting means being disposed within a unitary housing which is so constructed and arranged as to resist vibrations during use and while the vehicle is traveling over rough terrain.

2. Apparatus as defined in claim 1 including means for selectively de-energizing the signal transmitting means regardless of the fluid pressure acting on said switch means.

3. Fluid pressure warning apparatus which comprises a self-contained unit comprising an elongated hollow body member formed of dielectric material, a first electrically conductive contact member fixedly mounted within said body member and having fluid pressure conduit means formed therethrough, a terminal member projecting through said body member and engaging said first contact member, a second electrically conductive contact member slidably disposed in said body member and having an enlarged head portion and a reduced shank portion, sealing means disposed between said enlarged head portion and said body member, spring means surrounding said shank portion and disposed between said body member and said head portion, said shank portion having a bore formed therein, an electrically conductive plunger slidably positioned in said bore, resilient spring means disposed in said bore between said plunger and said second contact member for urging said plunger away from said second contact member, a battery supported by said body member, said plunger being urged into continual contact with said battery, signal transmitting means operatively connected to said battery, a second terminal projecting through said body member and connected to said signal transmitting means, and a strip of electrically conductive material connected between said terminals.

4. Apparatus as defined in claim 3, wherein said electrically conductive strip is pivotally connected to at least one of said terminals and detachably connected to the other of said terminals whereby said strip may be pivoted away from one of said terminals to interrupt the electrical circuit through said switch means.

5. Apparatus as defined in claim 3, including a second hollow body member, conduit means connecting said first and second body members including a tire valve therein, a second fluid conduit connected to said second body member and being in communication with said last mentioned fluid conduit, said second fluid conduit having a tire valve therein, said second body member including at least one other fluid conduit means in communication with said last mentioned fluid conduit.

References Cited in the file of this patent
UNITED STATES PATENTS

| | | |
|---|---|---|
| 2,037,016 | Fator | Apr. 14, 1936 |
| 2,727,221 | Sprigg | Dec. 13, 1955 |
| 2,794,083 | Moretti | May 28, 1957 |
| 2,834,844 | Zastrow | May 13, 1958 |
| 2,860,321 | Strickland | Nov. 11, 1958 |